US008837694B1

(12) United States Patent
Kline

(10) Patent No.: US 8,837,694 B1
(45) Date of Patent: Sep. 16, 2014

(54) SMARTER TELEPHONY AND E-MAIL PROTOCOLS

(71) Applicant: International Business Machines Corporation, Armonk, NY (US)

(72) Inventor: Eric Vance Kline, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/789,257

(22) Filed: Mar. 7, 2013

(51) Int. Cl.
H04M 15/00 (2006.01)
H04M 3/436 (2006.01)

(52) U.S. Cl.
CPC ............................ *H04M 15/43* (2013.01); *H04M 3/436* (2013.01)
USPC ................................ 379/114.21; 379/114.22

(58) Field of Classification Search
USPC ............. 379/114.05, 114.21, 114.22, 114.26, 379/127.03, 127.05; 455/406
See application file for complete search history.

(56) References Cited

U.S. PATENT DOCUMENTS

| | | | | |
|---|---|---|---|---|
| 5,381,467 | A * | 1/1995 | Rosinski et al. | 379/121.01 |
| 5,579,379 | A * | 11/1996 | D'Amico et al. | 379/114.01 |
| 5,999,967 | A | 12/1999 | Sundsted | |
| 6,353,663 | B1 | 3/2002 | Stevens et al. | |
| 6,373,931 | B1 * | 4/2002 | Amin et al. | 379/121.01 |
| 6,430,279 | B2 * | 8/2002 | Sawatzki et al. | 379/144.01 |
| 6,483,910 | B1 * | 11/2002 | Council | 379/127.01 |
| 6,650,742 | B1 | 11/2003 | Elliott et al. | |
| 6,697,462 | B2 | 2/2004 | Raymond | |
| 6,977,996 | B1 | 12/2005 | Brothers et al. | |
| 2002/0015483 | A1 * | 2/2002 | Gruchala et al. | 379/127.01 |
| 2002/0099670 | A1 | 7/2002 | Jakobsson | |
| 2009/0116628 | A1 * | 5/2009 | Ropolyi | 379/114.22 |

OTHER PUBLICATIONS

James B. Rule, "Call Me, Pay Fee", The New York Times, http://www.nytimes.com/2012/06/22/opinion/a-plan-to-stop-unwanted-phone-calls.html, Jun. 21, 2012.
E-mail Charging Plan to Beat Spam, BBC News, http://news.bbc.co.uk/2/hi/technology/4684942.stm, Last Updated: Monday, Feb. 6, 2006, Last Retrieved: Dec. 7, 2012.
Money Consumer Champion, "Beware Being Charged to Avoid Unwanted Calls", http://msnconsumerchampion.wordpress.com/2009/06/23/beware-being-charged-to-avoid-unwanted-calls/, Posted on Jun. 23, 2009, Last Retrieved: Dec. 7, 2012.

(Continued)

*Primary Examiner* — Quoc D Tran
(74) *Attorney, Agent, or Firm* — Kunzler Law Group; Steven L. Bennett

(57) ABSTRACT

An apparatus for filtering telephone calls includes a fee module, an exemption list module, a call module, a matching module, and a fee waiver module. The fee module charges a fee to a caller for an incoming call made by the caller to a user. The fee is specific to the incoming call. The exemption list module maintains an exemption list, which includes callers exempt from the fee, and their information. This information identifies an exempted caller when the call module receives an incoming call. The matching module determines if information associated with the incoming call matches an exempt caller's information on the exemption list. The fee waiver module exempts the incoming call from the fee when the matching module determines that the caller's information matches the information on the exemption list. The fee module charges the fee for incoming calls not exempted from the fee.

19 Claims, 7 Drawing Sheets

(56) References Cited

OTHER PUBLICATIONS

PUCO—"Do Not Call Registry: Preventing Unwanted Telemarketing Calls", http://www.puco.ohio.gov/puco/index.cfm/consumer-information/consumer-topics/do-not-call-registry-preventing-unwanted-telemarketing-calls/, pp. 1-3, Last Retrieved: Dec. 7, 2012.

Mike Masntok, Feds Charge First Spammers Under Can Spam, Techdirt, http://www.techdirt.com/articles/20040428/1538207.shtml, Apr. 28, 2004, Last Retrieved: Dec. 7, 2012.

John Borland, Virginia Files Felony Spam Charges, CNET News, http://news.cnet.com/2100-1028-5120673.html, Dec. 11, 2003, Last Retrieved: Dec. 7, 2012.

Declan McCullagh, Want to Stop Spammers? Charge 'em, CNET News, http://news.cnet.com/Want-to-stop-spammers-Charge-em/2010-1071_3-999561.html paper, May 5, 2003, Last Retrieved: Dec. 7, 2012.

Scott E. Fahlman, Spam and Telemarketing, http://www-2.cs.cmu.edu/~sef/spam-discussion.htm, pp. 1-10, Last Retrieved: Dec. 7, 2012.

IBM TDB, A Method for Controlling Unwanted Telephone Calls and E-mail, www.ip.com, IPCOM000015615D, Feb. 17, 2002.

\* cited by examiner

SMARTER TELEPHONY AND E-MAIL PROTOCOLS

BACKGROUND

1. Field

The subject matter disclosed herein relates to telecommunications and more particularly relates to call-filtering technology.

2. Description of the Related Art

Often times, individuals and businesses are flooded with unwanted telephone calls. These calls may be from solicitors, may be at undesirable times, or may just be generally unwanted. Responding to these unwanted calls may consume time, energy, and other important resources, such as network bandwidth, telephone lines, and patience. Furthermore, these unwanted calls may be difficult to block out for several reasons. For instance, the callers may frequently change or disguise their identifying information (e.g., telephone numbers). In addition, some call-blocking schemes may be over-inclusive, blocking out calls that, for whatever reason, are desirable to the call recipient.

BRIEF SUMMARY

An embodiment of an apparatus for filtering telephone calls includes a fee module, an exemption list module, a call module, a matching module, and a fee waiver module. The fee module charges a fee for an incoming call. The fee is specific to the incoming call and the incoming call is made by a caller to a user. The fee module charges the caller for the incoming call. The exemption list module maintains an exemption list. The exemption list includes one or more callers and associated information for each caller in the exemption list. This associated information is operable to identify a caller in the exemption list when the user receives an incoming call from a caller in the exemption list. The exemption list includes callers whose calls are exempt from the fee charged by the fee module.

The call module receives an incoming call. The matching module determines if information associated with the incoming call matches information associated with a caller in the exemption list. The fee waiver module exempts the incoming call from the fee charged by the fee module in response to the matching module determining that information associated with the incoming call matches information associated with the caller in the exemption list. The fee module charges the fee for each incoming call not exempted by the fee waiver module.

In one embodiment, the fee module includes a presentation module, an acceptance module, and a connection module. The presentation module presents the fee charged by the fee module to the caller in response to the matching module determining that the information associated with the incoming call does not match information associated with a caller in the exemption list. The acceptance module receives a notification that the caller accepts the fee when the presentation module presents the fee to the caller. And the fee module charges the fee to the caller for the incoming call when the acceptance module receives the notification that the caller accepts the fee. The connection module connects the incoming call to the user when the fee module charges the fee to the caller.

In another alternative embodiment, the fee module also includes a decline module and a disconnect module. The decline module receives a notification that the caller declined the fee in response to the presentation module presenting the fee to the caller. The fee module exempts the incoming call from the fee in response to the decline module receiving the notification that the caller declined the fee. The disconnect module disconnects the incoming call in response to the decline module receiving the notification that the caller declined the fee.

In another embodiment, the fee module includes a decline notification module, a revised fee module, and a revision notification module. The decline notification module sends a notification to the user that the caller declined the fee. The revised fee module receives a revised fee from the user and presents the revised fee to the caller. The revision notification module receives a notification that the caller accepts the revised fee in response to the revised fee module presenting the revised fee to the caller. The fee module charges the revised fee to the caller for the incoming call in response to the revised fee module receiving the notification that the caller accepts the revised fee. The connection module connects the incoming call to the user in response to the revised fee module receiving the notification that the caller accepts the revised fee.

In another embodiment, the exemption list module maintains the exemption list in response to input from the user. In another embodiment, the exemption list module includes a plurality of exemption lists. Each exemption list is associated with one or more users. In another embodiment, one or more callers on the exemption list include contacts of the user on a social media account of the user within a social media application. In another embodiment, one or more callers on the exemption list include contacts within an electronic contact list maintained by the user.

In one embodiment, the contacts within the electronic contact list include a subset of contacts maintained by the user. This subset includes contacts designated by the user for the exemption list. In another embodiment, the associated information of callers in the exemption list includes information derived from a contact list associated with the user's social media account within a social media application and/or contacts within an electronic contact list maintained by the user. In another embodiment, the matching module detects, within the information associated with the incoming call, an exemption code. The fee waiver module exempts the incoming call from the fee and the exemption list module places the caller and the associated information that identifies the caller on the exemption list in response to the matching module detecting the exemption code.

In another embodiment, the apparatus includes a fee payment notification module that notifies the user that the fee module has charged the fee to the caller. In a further embodiment, the fee payment notification module notifies the user of an obligation of a minimum call time. If the call ends prior to the passing of the minimum call time, the fee waiver module exempts the incoming call from the fee or reduces the fee charged to the caller.

A method for filtering telephone calls includes charging a fee for an incoming call. The fee is specific to the incoming call and the incoming call is made by a caller to a user. The fee is charged to the caller for the incoming call. The method includes maintaining an exemption list. The exemption list includes one or more callers and associated information for each caller in the exemption list. The associated information is operable to identify a caller in the exemption list when the user receives an incoming call from a caller in the exemption list. The exemption list includes callers whose calls are exempt from the fee.

The method includes receiving an incoming call and determining if information associated with the incoming call matches information associated with a caller in the exemption list. The method includes exempting the incoming call from the fee charged to the caller in response to determining that information associated with the incoming call matches information associated with the caller in the exemption list. The fee is charged for each incoming call that is not exempted.

In one embodiment, the method includes presenting the fee charged to the caller in response to determining that the information associated with the incoming call does not match information associated with a caller in the exemption list. In the embodiment, the method includes receiving a notification that the caller accepts the fee, and charging a fee for an incoming call also includes charging the fee to the caller for the incoming call in response to receiving the notification that the caller accepts the fee. In the embodiment, the method also includes connecting the incoming call to the user in response to charging the fee to the caller.

In another embodiment, the method includes receiving a notification that the caller declined the fee in response to the caller being presented the fee. The incoming call is exempted from the fee in response to receiving the notification that the caller declined the fee. In the embodiment, the method includes disconnecting the incoming call in response to receiving the notification that the caller declined the fee.

In another embodiment, the method includes sending a notification to the user that the caller declined the fee, receiving a revised fee from the user and presenting the revised fee to the caller, and receiving a notification that the caller accepts the revised fee in response to the caller being presented the revised fee. The revised fee for the incoming call is charged to the caller in response to receiving the notification that the caller accepted the revised fee and the incoming call is connected to the user in response to receiving the notification that the caller accepted the revised fee. In another embodiment, maintaining the exemption list includes maintaining a plurality of exemption lists, and each exemption list is associated with one or more users. In another embodiment, one or more callers on the exemption list include contacts of the user on a social media account of the user within a social media application.

A computer program product for selectively filtering telephone calls includes a computer readable storage medium with program code embodied in the medium. The program code is readable and/or executable by a processor to charge a fee for an incoming call, maintain an exemption list, receive an incoming call, determine if information associated with the incoming call matches information associated with a caller in the exemption list, and exempt the incoming call from the fee charged to the caller in response to determining that information associated with the incoming call matches information associated with the caller in the exemption list. The fee is specific to the incoming call. The incoming is made by a caller to a user, and the fee is charged to the caller for the incoming call. The exemption list includes one or more callers and associated information for each caller in the exemption list. The associated information is operable to identify a caller in the exemption list when the user receives an incoming call from a caller in the exemption list. The exemption list includes callers whose calls are exempt from the fee.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
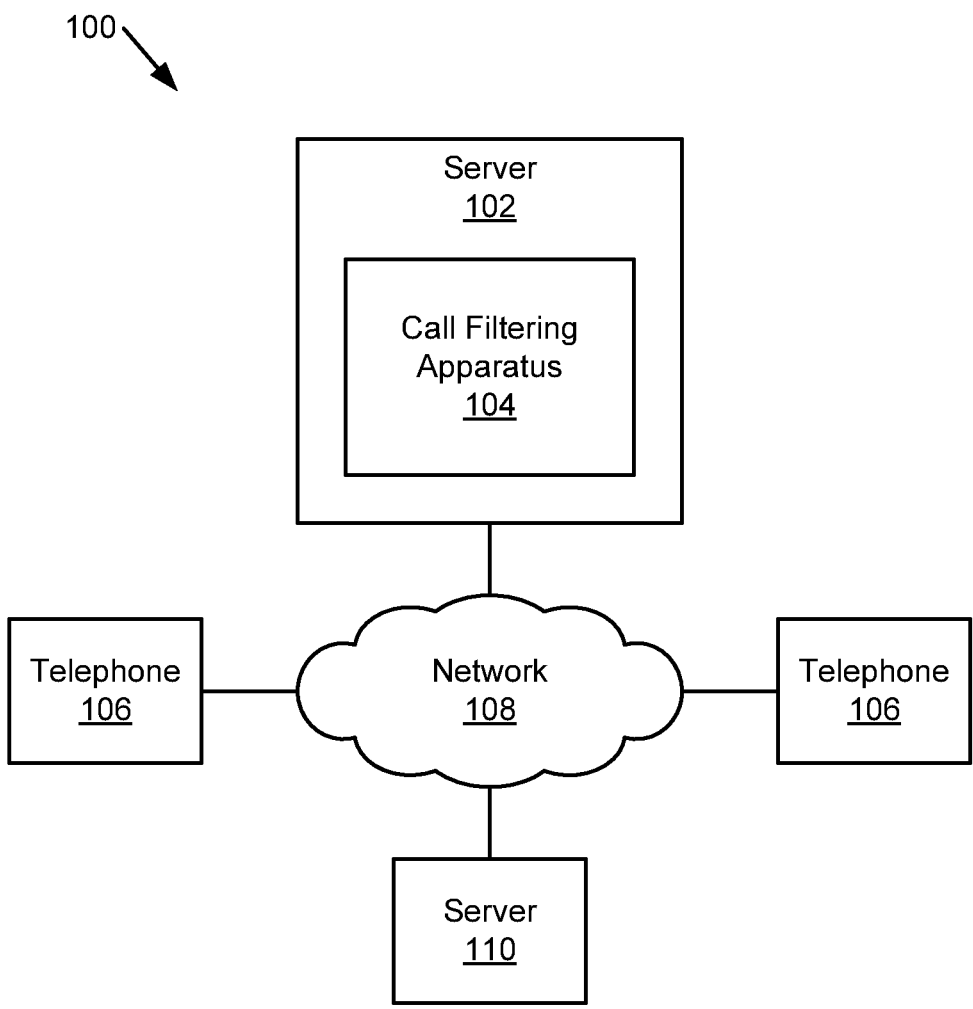
FIG. 1 is a schematic block diagram illustrating one embodiment of a system for filtering telephone calls.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

FIG. 1 is a schematic block diagram illustrating one embodiment of a system 100 for filtering telephone calls. The system 100 includes a server 102, a call filtering apparatus 104, a telephone 106, a network 108, and a server 110 that may or may not include a call filtering apparatus 104. Each of these exemplary elements is described in further detail below.

In one embodiment, the system 100 includes a server 102. The server 102, in one embodiment, connects a call to a telephone 106. The server 102 may be implemented in a variety of ways. For example, the server 102 may be maintained by a telephone service provider, an individual or business where the call is received, an internet service provider, etc. The server 102 may be for example, a telephone switch router, an internet server, a router, a desktop or laptop computer, a smartphone or tablet, or the like. The server may also include a call filtering apparatus 104.

The system 100, in one embodiment, includes a second server 110 that may or may not include a call filtering apparatus 104. The second server 110 may be implemented in any of the same ways as the server 102 described above. The second server 110 may route calls to a second telephone 106 where the server 102 described above may route calls to a first telephone 106.

The call filtering apparatus 104 may charge callers for an incoming call, and may exempt callers on an exemption list from such a charge. The call filtering apparatus 104 is described in more detail with regard to the apparatus 200 of FIG. 2 and the apparatus 300 of FIG. 3. Some or all of the call filtering apparatus 104 may be implemented in the server 102, or it may be implemented elsewhere. For example, the call filtering apparatus 104 may be implemented in the telephone 106, in a stand-alone device maintained by the telephone owner, in a server center, in a home or business, and so on.

The call filtering apparatus 104 may be implemented in a variety of different ways, including as part of a telephone, computer, smartphone, or tablet, as part of a server, and the like. Furthermore, the call filtering apparatus 104 may be implemented in the hardware, firmware, or software of any of these devices.

The system 100 includes one or more telephones 106, which may place and receive telephone calls. The one or more telephones 106 may be a cell phone, landline, walky-talky, computer, tablet, television, or the like, and may be any combination of these devices.

The system 100 also includes a network 108. The network 108 may be implemented in a variety of forms. For example, the network 108 may be a telephone network, such as a packet-switched telephone network ("PSTN"), a voice-over-internet ("VoIP") protocol network, an internet connection, such as local area network ("LAN"), a wide area network ("WAN"), a fiber optic network, internet over power lines, and the like, or any other kind of network connection. Additionally, the network 108 may be any combination of these implementations. For example, the network 108 may include both a computer network, such as fiber optic or WAN, and a telephone network. For example, a telephone 106 may communicate with a server 102 over a telephone network, and the server 102 may communicate with a second server 110 over a computer network 108, and the second server 110 may then communicate with a second telephone 106 over a telephone network. The network 108 may be implemented using any combination of routers, cables, switches, fiber optic, power lines, radio, and the like. One of skill in the art will recognize other ways to implement a network 108 for communications between telephones 106 and servers 102, 110.

Figure 2:
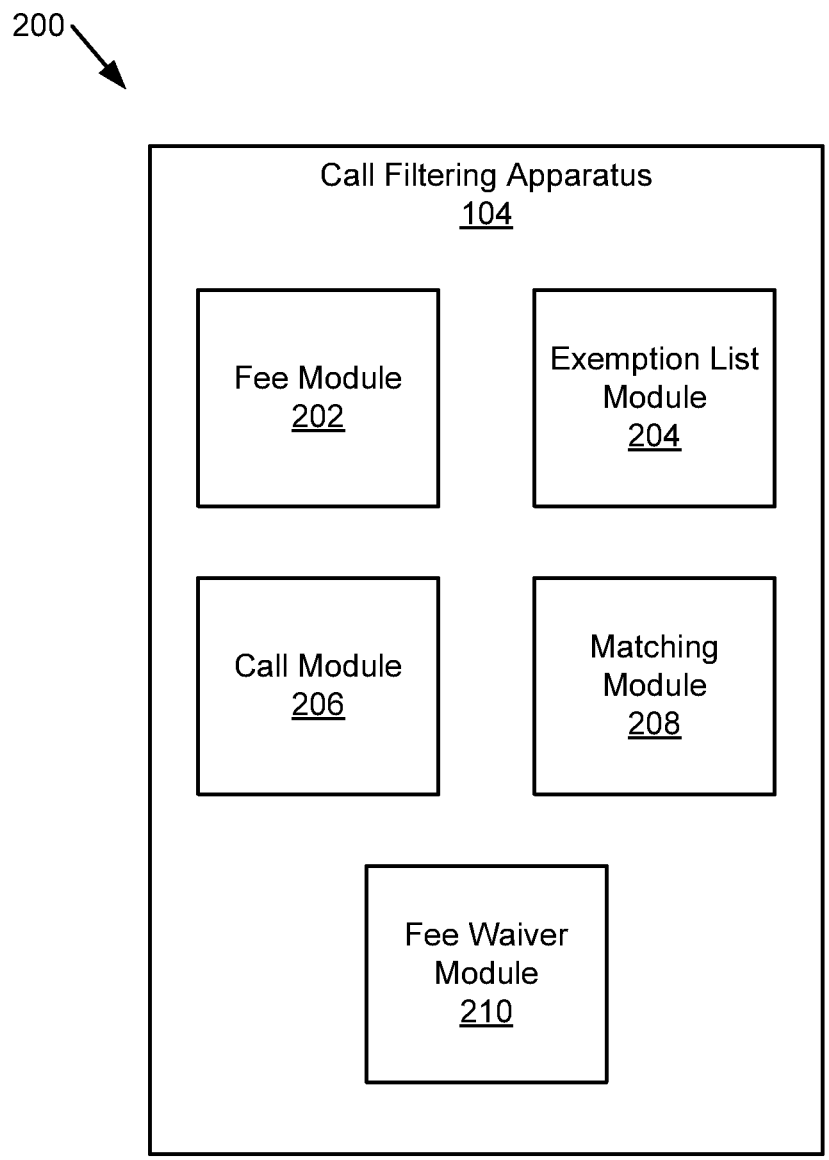
FIG. 2 is a schematic block diagram illustrating one embodiment of an apparatus for filtering telephone calls.

FIG. 2 is a schematic block diagram illustrating one embodiment of an apparatus 200 for filtering telephone calls.

The apparatus 200 includes a call filtering apparatus 104 with a fee module 202, an exemption list module 204, a call module 206, a matching module 208, and a fee waiver module 210, which are described in detail below.

The apparatus 200 includes a fee module 202 that charges a fee for an incoming call. The fee module 202 may charge this fee in a variety of different ways. For example, the fee module 202 may charge the fee by charging a caller's credit card. The fee module 202 may do this by, for example, prompting the caller to provide the caller's credit card information over the telephone, by sending the caller an email containing an entry form, by sending the caller a text message prompt, and the like. The fee module 202 may also charge the fee, for example, by collecting banking information from the caller, and then debiting the caller's bank account for the fee. Another way the fee module 202 may charge the fee is by sending the caller a bill (e.g., by email, text message, post, or the like).

The fee module 202 may charge the fee through a variety of channels. For example, the fee module 202 can charge the fee through an internet service provider or telephone service provider, through a user's electronic account (e.g., Paypal™), bank account, credit card provider, and through any other channel that will be recognized by a person of ordinary skill in the art.

The fee module 202 charges are specific to the incoming call. The intent of the call filtering apparatus 104, in one embodiment, is for a user to charge for incoming phone calls where the caller is not on an exemption list. Typically, the fee module 202 charges a fee above what a telephone service provider would typically charge for a call. A typical telephone service provider usually has an agreement with a user to provide telephone service to the user and may charge the user for particular calls, such as incoming and outgoing long distance calls, calls made to a pay-per-use number, such as an adult entertainment number, calls to a service to provide directory information, and the like. Thus, the fee module 202, in one embodiment, charges a fee for incoming calls beyond typical service fees charged to the user by the user's telephone service provider.

The fee module 202 charges the caller for an incoming call, which incoming call may be made by a caller and to a user. The incoming call may be any kind of voice call, any kind of video call, or any combination of a voice and video call. For example, the incoming call may originate from traditional telephone connected to a landline, from a cell phone or smartphone, from a desktop or laptop computer, from a server 102, from an automatic telephone operating system, or the like. The call may also be transmitted over a variety of media, as described above (e.g., VoIP, PSTN, etc.).

Similar to the incoming call, the caller may take many forms. For example, the caller may be an individual. The caller may also be automated. For example, the caller may be an automated calling system implemented in hardware (e.g., a calling machine) or software (e.g., a calling script).

In one embodiment, the user is a person or device that receives the incoming call from the caller. For example, the user may be an individual. In one embodiment, the user does not operate the telephone 106 in order for the call filtering apparatus 104 to filter telephone calls. In one embodiment, the fee module 202 charges a fee to the caller when the user does not accept or answer the incoming call. The user, in one embodiment, is an automated phone answering system or answering machine, such as may be implemented in hardware or software. In another embodiment, the fee module 202 charges a fee for calls answered by a user that is a person.

The apparatus 200 includes an exemption list module 204 that maintains an exemption list. In one embodiment, the exemption list module 204 maintains the exemption list through input from an individual (e.g., a customer of a phone company). In another embodiment, a phone service provider maintains the exemption list. For example, a system administrator of the telephone service provider may maintain the exemption list. In another embodiment, the exemption list module 204 maintains the exemption list through input from a software application or other source. The exemption list module 204, in one embodiment, is given general directives that automate maintaining the exemption list without any other outside direction (e.g., from the user). The exemption list module 204, in another embodiment, may maintain the exemption list by taking a number of different actions, including, for example, adding or removing entrants, modifying the information associated with callers, changing a caller to charge mode, and the like.

In another embodiment, the call filtering apparatus 104 may include a charge mode, and a caller's information may remain on the exemption list even though the caller is not exempted from being charged a fee by the fee module 202. In the embodiment, at a later time, the exemption list module 204 may the take the caller out of charge mode, at which time the caller may be exempt from being charged a fee. In a further embodiment, when the exemption list module 204 changes a caller to charge mode, the exemption list module 204 may send a notification to the user indicating this change. The notification may be sent by email, text message, social media (e.g., Twitter), and the like. In addition, this notification may be sent on a recurring basis, and may recur on a periodic basis.

The exemption list may include one or more callers and associated information for each caller in the exemption list. The associated information may be used determine whether the caller is on the exemption list. For example, the exemption list may include the information of callers that a user does not want the fee module 202 to charge a (q fee for an incoming call. For example, the exemption list may include information of family, friends, associates, and the like.

The information associated with each caller in the exemption list may also take various forms. For example, the information may include the caller's name, telephone number, email address, geographic location, description, status on social media sites, etc. Thus, in one embodiment, the information associated with a caller may include information indicating that the caller is "friends" with the user on Facebook®, or that the user follows the caller on Twitter. The associated information may also include a code or pattern recognizable to a computing device that identifies a caller. The code or pattern, in one embodiment, is not visible to the user and may be transmitted with the incoming call. One of skill in the art will recognize other information associated with a caller to be grouped with a caller in the exemption list to identify the caller.

The exemption list module 204 may also, in various embodiments, create groupings of callers based on the information associated with the callers. For example, the exemption list module 204 may create a group called "Facebook friends that should be charged for incoming calls." The exemption list module may then place this entire group in charge mode, such that any of the user's Facebook friends must pay a fee for the incoming call. The exemption list module 204 may also create other groups of individuals that are not to be charged the fee by the fee module 202. For example, the user may create a group called "Facebook friends not be charged" and the exemption list module 204 may maintain an exemption list for callers placed in the "Facebook friends not be charged" group.

In another example, the exemption list module 204 may maintain callers' information in the exemption list by designating users with group indicators. For example, the exemption list module 204 may embed in the information associated with certain callers the designation of "Wanted Solicitors." Using such a group organization scheme, the exemption list module 204 may periodically place groups in charge mode. For example, the exemption list module 204 might place the "Wanted Solicitors" group in charge mode between the hours of 6 PM and 8 AM. The fee module 202 may then charge callers from the "Wanted Solicitors" group a fee for calling during those hours. In another embodiment, the exemption list module 204 may include callers' information on the exemption list where the callers are from a particular category or type. For example, the exemption list module may include emergency operators, calls from government agencies, calls from doctors, calls from civic groups, or the like.

The apparatus 200 includes a call module 206 that receives an incoming call. In one embodiment, the call module 206 receives the incoming call through the network 108. For example, the call module 206 may receive the incoming call over a telephone network 108. The call module 206 may also, for example, function to extract information associated with the incoming call, and feed that information to other modules in the call filtering apparatus 104. For example, the call module 206 may extract the name of the caller placing the incoming call and may feed the name of the caller to the fee module 202 so that the fee module 202 may determine the fee associated with the caller. Additionally, the call module 206 may feed the name of the caller to the exemption list module 204 so that the caller's information may be placed on the exemption list, for example if the user chooses that the caller be placed on the exemption list. The call module 206 may, in another example, feed the name of the caller to the matching module 208 (described in detail below) so that the matching module 208 may determine whether the caller's information is on the exemption list. Other modules may also feed or retrieve information from the incoming call identifying the caller.

The call module 206, in various embodiments, may also function to count the elapsed time of the incoming call if the incoming call ends up being connected to the user. For example, the call filtering apparatus 104 may obligate a minimum call time for an incoming call before the fee module 202 charges a fee.

The apparatus 200 includes a matching module 208 that determines if information associated with the incoming call matches information associated with a caller in the exemption list. The matching module 208 may, for example, receive from the call module 206 information identifying an incoming caller. The matching module 208 may then search the exemption list to determine whether information associated with the caller exists in the exemption list.

The matching module 208 may determine if the information associated with the incoming call matches information associated with the caller in the exemption list in a number of various ways. For example, the matching module 208 may determine on a bit-by-bit basis of all the information available if there is an exact match. The matching module 208 may also determine if only a sub-portion of the information matches. For example, the matching module 208 may determine whether only the "Name" associated with the incoming call matches the "Name" on the exemption list. The matching module 208 may make such a determination, for example, using logical operations on the information (e.g., an XOR comparison).

Alternatively, the matching module 208 may be configured to determine that the information associated with the incoming call matches information associated with the caller in the exemption list even if there is not an exact match. For example, while there may not be an exact match between the information, the matching module 208 may determine there is a match if a certain sub-set of the information matches. One example of this may be where the information associated with the caller on the exemption list is more detailed, such as "San Diego, Calif. 92130," in the example where the information is geographical. In this case, the matching module 208 may determine that there is a match when the information associated with the incoming call is, for example, "San Diego, Calif. 92127" but may then determine that there is still a match even though the zip codes do not match.

The apparatus 200 includes a fee waiver module 210 that exempts the incoming call from the fee charged by the fee module 202 in response to the matching module 208 determining that information associated with the incoming call matches information associated with the caller in the exemption list. The fee waiver module 210 may exempt the incoming call from the fee in a number of ways. For example, the fee waiver module 210 may prevent the fee module 202 from charging the fee. In another example, where the fee module 202 has charged a fee for the incoming call, the fee waiver module 210 may credit the user's credit or bank account for the fee, may cancel the fee transaction (e.g., in an electronic debiting scheme), may initiate a transfer from the user's account to the caller's account (e.g., as a refund for the fee), may send the caller a refund check for the fee amount, may send the caller a gift card for the fee amount that may be used to pay the fee for future calls, and the like.

The fee waiver module 210 exempts the incoming call from the fee in response to the matching module 208 determining that information associated with the incoming call matches information associated with the caller in the exemption list. If the matching module 208 determines that the information matches, the fee waiver module 210 may exempt the incoming call from the fee charged by the fee module 202, as described above. If however, the matching module 208 determines that the information does not match, the fee waiver module 210 may not exempt the incoming call from the fee charged by the fee module 202.

In one embodiment, the exemption list module 204 maintains the exemption list in response to input from a user. The exemption list module 204 may receive input from the user in a variety of ways. For example, the user may provide input to the exemption list module 204 through an automated telephone call system, possibly through a system set up by the telephone service provider (or other entity managing the fee module 202). By navigating the automated telephone system the user may, for example, add or remove callers to or from the exemption list, change the information associated with callers already on the exemption list, change the status of callers on the exemption list (e.g., put callers in or out of charge mode), and so on. The user may also, for example, converse via telephone call, instant message, or email, etc., to a system administrator of the telephone service provider (or other entity managing the fee module 202), who, at the direction of the user may provide input to the exemption list module 204 that enables the exemption list module 204 to maintain the exemption list according to the user's directives.

In another example, the user may provide input to the exemption list module 204 through a digital interface. Such an interface may be accessible through, for example, a mobile software application, a graphical user interface ("GUI") on the user's home telephone, computer software, an internet website, or the like. Particularly, in the example of a GUI on the user's home telephone, the exemption list module 204 may cause the user's telephone to display a GUI that displays the exemption list. Further, the user may maintain the exemption list by interacting with the GUI. For example, the user may provide input associated with a particular user on the exemption list through this GUI. Then, the GUI may send this input to the exemption list module 204, which may then maintain the exemption list according to the user's directives. This same basic process may govern the other interfaces described above.

In another alternative embodiment, the exemption list module 204 may include a plurality of exemption lists. For example, the exemption list module 204 may include the exemption lists of several different users, each exemption list being associated with one or more users. Thus, the exemption list module 204 may be common to a number of users. The exemption list module 204 maintaining multiple exemption lists may allow for the exemption list module 204 to be located, for example, on a common server 102 maintained by the telephone service provider, internet service provider, or the like. In addition, the exemption list module 204 may include an exemption list common to more than one user. For example, the exemption list module 204 may include an exemption list for all the users within a particular office building or company. The exemption list module 204 maintaining multiple exemption lists may allow the exemption list module 204 to maintain exemption lists in a centralized, efficient manner.

Alternatively, the exemption list module 204 may include exemption lists for the telephone lines of several different users, companies, etc. In another example, the exemption list module 204 may include several different exemption lists for a single user. If a user has several telephones, the exemption list module 204 may include a separate exemption list for each telephone or may have one exemption list common to the several telephones of the user. Or, if a user has several different telephone lines routed to a single device, the exemption list module 204 may include a separate exemption list for each of these lines. This may be used in enterprise applications, for example.

In another alternative embodiment, the callers on an exemption list may include contacts of the user on a social media account of the user within a social media application. For example, a user's exemption list may include the user's "Friends" on Facebook®, "Connections" on LinkedIn®, "Followers" on Twitter®, and so on. In such an embodiment, the user may stop particular social medial applications from inputting contacts to the user's exemption list. For example, the user may choose to have Facebook contacts on the exemption list but not Twitter contacts. Furthermore, the user may remove certain social media contacts from the exemption list while retaining others.

In such an example, the exemption list module 204 may be configured to communicate with the user's social media accounts, so that when the user adds or removes connections on the social media application, the exemption list module 204 may automatically maintain the user's exemption list to reflect such additions or removals.

In another alternative embodiment, the exemption list may include contacts within an electronic contact list maintained by the user. For example, the exemption list module 204 may communicate with a user's electronic contact list, whether the list is contained in a text file, telephone contact list, internet web page, or the like. Accordingly, the exemption list module 204 may receive inputs from any of these sources and add the information from the source to the exemption list. The allows the exemption list module 204, for example, to place all of a user's cell phone contacts on the exemption list.

In addition, the exemption list module 204 may periodically prompt the user to refresh the input from the user's lists. Such refreshes help to ensure that the user's exemption list reflects an up-to-date version of the user's electronic contact lists. Alternatively, the exemption list module 204 may be configured to automatically sync to one or more of the user's exemption lists. This may enable the exemption list module 204 to refresh the exemption list such that it typically reflects updates made to the user's electronic contacts lists.

Another alternative embodiment is similar to above-described embodiment concerning the exemption list and a user's contacts on an electronic contact list. In this alternative embodiment, however, the user may designate particular contacts on the user's electronic contact list for the exemption list module 204 to place on the exemption list. Accordingly, only a subset of the contacts on the user's electronic contact list is placed on the exemption list. This allows the user to, for example, carefully tailor which of the contacts on the user's contact list may call the user without being charged a fee. Thus, the user may benefit from the convenience of the exemption list syncing to the user's electronic contact list while still maintaining control over which contacts the exemption list module 204 places on the exemption list.

In another embodiment, the associated information of callers in the exemption list may include information derived from a contact list associated with the user's social media account within a social media application, and/or contacts within an electronic contact list maintained by the user. This may effectively allow the exemption list module 204 to maintain an exemption list containing contacts from both a user's electronic contact lists (or subsets thereof) and a user's social media contacts (or subsets thereof). This alternative may vary in fashions similar to the above-described alternative embodiments pertaining to social media and electronic contact lists.

In addition, in this alternative embodiment, the exemption list module 204 may coordinate the interaction between the user's social media contacts and the user's electronic contact lists. For example, if a user designates that one of the user's particular social media contacts should not be placed on the exemption list, and if that same particular social media contact is also a contact from one of the user's electronic contact lists, the exemption list module 204 may prompt the user whether that contact should be removed from the exemption list or may follow a particular hierarchy or rule for conflicts. If the contact from the electronic contact list should be removed, the exemption list module 204, in one embodiment, may prevent the contact from being placed back on the exemption list during future syncs with the user's electronic contact list.

In another embodiment, the matching module 208 may detect, from the information associated with the incoming call, an exemption code. For example, the fee waiver module 210 may exempt the incoming call containing the exemption code and the exemption list module 204 may place the caller and the associated information that identifies the caller on the exemption list. The exemption code may be included in the information associated with the incoming call in a number of ways.

For example, the user may provide the exemption code to the caller. Then, the caller may be prompted to enter the exemption code when the caller calls the user. The user may provide the exemption code to the caller in a number of ways.

For example, the user may provide the exemption code to the caller via text message, email, through a social media application, and so on. Alternatively, the apparatus 200 may be configured to provide the exemption code to the user.

In one embodiment, the caller may associate the exemption code with the user's contact information on the caller's telephone 106 such that the exemption code is included in the information associated with the incoming call from the caller. For example, if the user sends the exemption code to the caller via text message, the caller's telephone 106 may then import the exemption code into the caller's contact information for the user (e.g., Name: Bob; Number: 555-7201; Exemption Code: 7462A). The caller's telephone then may send the exemption code, and the fee waiver module 210 may waive the fee for any incoming call from the user, and the exemption list module 204 may place the caller on the exemption list. The caller may send the exemption code prior to or during a call to the user. Alternatively, the exemption code may be a discount code (rather than an exemption code that waives the fee entirely, as described above). The discount code may cause the fee module 202 to reduce the fee charged to the caller for the incoming call.

Figure 3:
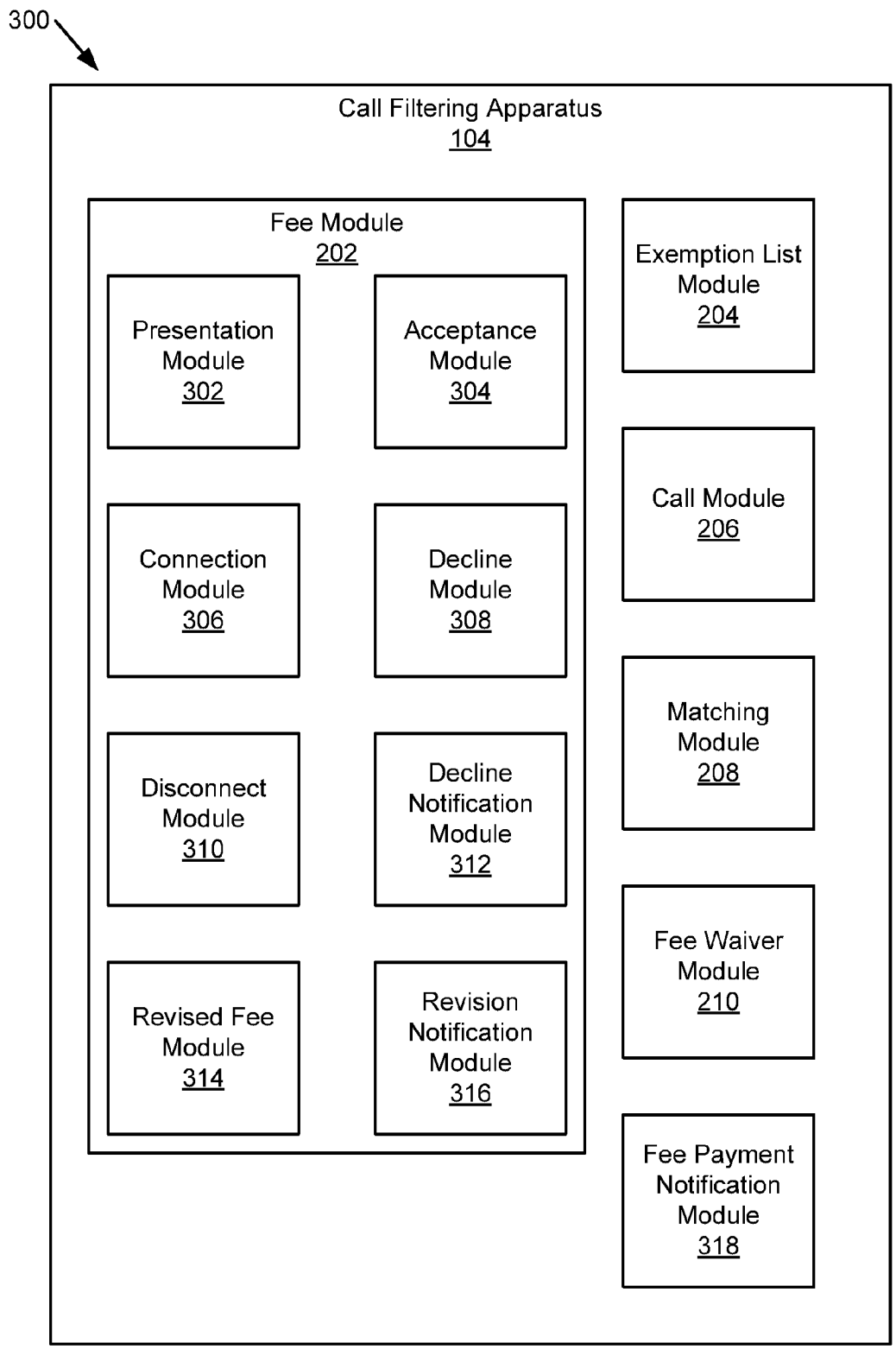
FIG. 3 is a schematic block diagram illustrating another embodiment of an apparatus for filtering telephone calls.

FIG. 3 is a schematic block diagram illustrating another embodiment of an apparatus 300 for filtering telephone calls. The apparatus 300 includes a call filtering apparatus 104 with a fee module 202, an exemption list module 204, a call module 206, a matching module 208, and a fee waiver module 210, which are substantially similar to those described above in relation to the apparatus 200 of FIG. 2. The apparatus 300, in various embodiments, may include one or more of a presentation module 302, an acceptance module 304, a connection module 306, a decline module 308, a disconnect module 310, a decline notification module 312, a revised fee module 314, and a revision notification module 316, which are described in detail below.

In one embodiment, the fee module 202 includes a presentation module 302 that presents the fee charged by the fee module 202 to the caller in response to the matching module 208 determining that the information associated with the incoming call does not match information associated with a caller in the exemption list. The presentation module 302 may present the fee to the caller in a variety of ways.

For example, the presentation module 302 may present the fee to the caller via the caller's call status screen. In such an example, the presentation module 302 may cause information about the fee to be displayed on a screen of the caller's telephone 106, possibly along with other information about the incoming call. So, for example, in addition to possibly displaying the number that the caller is calling, and the elapsed time of the call, etc., once the presentation module 302 presents the fee charged by the fee module 202, the caller's telephone 106 may also display the fee (e.g., "FEE: $1.50"). In addition to displaying the fee, the presentation module 302 may present an interface that allows the user to accept or reject the fee presented. Such an interface may include, for example, "Accept" and "Deny" touch buttons on the telephone 106 screen that the caller may use to accept or deny the fee.

The presentation module 302 may also, for example, present the fee to the caller in an audible message. In this example, after the caller has placed the incoming call to the user, the presentation module 302 may use a recorded voice to present the fee to the caller. The presentation module 302 in this example may configure the voice to say, "A fee of one dollar is required to connect this call." In addition, the presentation module 302 may prompt the caller as to whether the caller would like to accept or decline the fee.

These communications from the presentation module 302 may be made to the caller, for example, after the caller makes the call but before the caller's telephone 106 starts ringing, between rings, etc. In one embodiment, the user's telephone 106 may not ring or receive the incoming call before the caller has paid or been exempted from the fee. Once the presentation module 302 has presented the fee charged by the fee module 202 to the caller, the presentation module 302 may collect information about whether the caller would like to accept or decline the fee. In addition, the presentation module 302 may present a safety valve notification to the caller. For example, if the caller decides to accept or decline the fee in response to the presentation module 302 presenting the fee charged by the fee module 202, the presentation module 302 may prompt the user to make sure the user did not accept or decline the fee by mistake.

In one embodiment, the fee module 202 includes an acceptance module 304 that receives a notification that the caller accepts the fee. This notification may be binary—for example, either yes or no—or may be more complex—for example, by including information that the caller accepts the fee, as well as information about the fee, how the fee will be charged, how much call time the fee obligates, etc. The acceptance module 304 may receive this notification from the presentation module 302, for example, in response to the presentation module 302 presenting the fee to the caller. The fee module 202 may then charge the fee in response to the acceptance module 304 determining that the caller accepts the fee.

In one embodiment, the fee module 202 includes a connection module 306 that connects the incoming call to the user in response to the fee module 202 charging the fee to the caller, or possibly in response to the acceptance module 304 determining that the caller accepts the fee. Accordingly, the connection module 306 may connect the incoming call from the call module 206 to a user's telephone 106. Once the connection module 306 connects the incoming call to the user's telephone 106, the connection module 306 may notify the fee module 202 that the connection module 306 has made such a connection and the fee module 202 may then charge the fee to the caller.

The connection module 306 may also, for example, monitor the connected call to determine whether or not the connected call is ultimately received by a user. In one embodiment, this may allow the apparatus 300 to cause the fee module 202 not to charge a fee to a caller for an incoming call that is not answered by a user.

In yet another embodiment, the connection module 306 may notify the fee module 202 that the caller has left a voice mail for the user. In one embodiment, the fee module 202 may charge the fee even though the user did not answer the incoming call. In another embodiment, the fee module 202 may charge a fee for the incoming call that is connected by the connection module 306, whether or not the connected call is ultimately received by a user.

In yet another example embodiment, the connection module 306 may monitor the connected call to enable the fee module 202 to refund to the caller a fraction of or the entire fee charged by the fee module 202 if the incoming call is not ultimately received by the user. For example, the connection module 306 may notify the fee module 202 that the user's telephone 106 rang two times out of a total eight rings possible before the incoming call goes to voice mail. Therefore, the fee module 202 may refund to the caller 75% of the total fee. In another embodiment, the connection module 306 may charge a reduced fee if the incoming call goes to voicemail of the user.

In another embodiment, the fee module 202 includes a decline module 308 that receives a notification that the caller declined the fee in response to the presentation module 302 presenting the fee to the caller. In this embodiment, the caller may decide that, for whatever reason, the caller does not want to pay the fee. In such an example, the caller may indicate this by navigating the presentation from the presentation module 302 (described above). For example, the caller may deny the fee by saying "decline" or "no," or by selecting "decline fee" on a user interface, depending on what prompt the presentation module 302 provides.

Once the caller has declined the fee, the presentation module 302 may send to the decline module 308 a notification containing information indicating that the caller declined the fee. The decline module 308 may then process this information and send it to the fee module 202. Accordingly, the fee module 202 may exempt the incoming call from the fee.

In one embodiment, the fee module 202 includes a disconnect module 310 that disconnects the incoming call in response to the decline module 308 receiving the notification that the caller declined the fee. The disconnect module 310 may, for example, disconnect the incoming call before the user's telephone 106 rings, while the user's telephone 106 is ringing, or the disconnect module 310 may disconnect the call after the user or an answering machine answers the incoming call. The disconnect module 310 may also, for example, notify the caller that the disconnect module 310 has disconnected the incoming call.

In another embodiment, the fee module 202 includes a decline notification module 312 that sends a notification to the user that the caller declined the fee. The decline notification module 312 may send this notification to the user in various ways. For example, the decline notification module 312 may display a message on the user's telephone 106 that the caller declined the fee. This message may, for example, be flashing on the user's telephone 106 during the time that the user may respond (described in detail below), and then may stop flashing after the time during which the user may respond. Alternatively, the decline notification module 312 may send a message to the user indicating that the caller declined the fee. The message from the decline notification module 312 may be, for example, a text message, an email, information on a phone bill, or the like.

In one embodiment, the apparatus 300 includes a revised fee module 314 that receives a revised fee from the user and presents the revised fee to the caller. The revised fee module 314 may enable the user to effectively negotiate a fee that both the user and the caller find acceptable. For example, the caller may decline the fee (e.g., a $1.00 fee), at which point the decline notification module 312 may notify the user that the caller declined the fee. Then, the revised fee module 314 may present a revised fee (e.g., a $0.75 fee) to the caller. This process may repeat, allowing the caller and user to bargain for an acceptable fee. This bargaining may occur real-time during a single call, for example, via the caller's and user's telephone 106 displays and associated user interfaces. In another embodiment, the revised fee module 314 may be pre-programmed to revise the fee to the caller and may present a revised fee to the caller without the user manually entering a revised fee at the time of the incoming call.

Alternatively, the bargaining may occur in increments over several different calls. For example, as described above, the decline notification module 312 may send a message (e.g., a text message) to the user indicating that the caller declined the fee. In response, the revised fee module 314 may receive from the user a revised fee that is lower than the original fee. The revised fee module 314 may then, for example, present this revised fee to the fee module 202. Then, the next time the caller calls the user, the fee module 202 may charge the caller the lower, revised fee, at which point the caller may either accept or decline this fee. This exemplary process may repeat until the caller and user resolve on a revised fee acceptable to both parties. This negotiation may be beneficial to both parties because the user may collect a fee he values while the caller may place a call he values more highly than the revised fee.

In one embodiment, the fee module 202 includes a revision notification module 316 that receives a notification that the caller accepts the revised fee in response to the revised fee module 314 presenting the revised fee to the caller. Upon receiving this notification, the revision notification module 316 may communicate with the fee module 202 in such a way to cause the fee module 202 to charge the revised fee to the caller.

The revision notification module 316 may contribute to the bargaining process described above. For example, the revision notification module 316 may complete the bargaining process by communicating with other modules in the call filtering apparatus 104. When the caller accepts the revised fee, for example, the revision notification module 316 receives a notification of such acceptance, at which point the revision notification module 316 may communicate with the connection module 306, so that the connection module 306 may connect the call to the user's telephone 106. With respect to the revised fee, the connection module 306 may have all the same capabilities it has regarding the fee (e.g., the connection module 306 may monitor the connected call to determine whether or not the connected call is ultimately received by a user, etc.).

In another embodiment, the call filtering apparatus 104 may include a fee payment notification module 318 that notifies the user that the caller has been charged a fee by the fee module 202. The fee payment notification module 318, in one embodiment, notifies the user as soon as the fee module 202 completes the charge transaction. In addition, the fee payment notification module 318 may notify the user of the charge in a number of different ways. For example, the fee payment notification module 318 may notify the user via audible message on the telephone 106 (e.g., during the call), via a tone emitted from the user's telephone 106, via automated telephone call or voicemail, text message, email, an internet website, a GUI on the user's telephone 106, and so on.

The fee payment notification module 318 may notify the user during or after the call that the caller has been charged a fee by the fee module 202. If the fee payment notification module 318 notifies the user after the call, the fee payment notification module 318 may be configured do so in a variety of ways. For example, the fee payment notification module 318 may notify the user on a periodic basis that one or more callers have been charged a fee. This periodic basis may be configured to be, for example, each hour, each day, and so on.

In addition, the fee payment notification module 318 may notify the user of the caller's form of payment. For example, in addition to notifying the user that the fee module 202 has charged the fee to the caller, the fee payment notification module 318 may notify the user that the fee was charged to the caller's credit card. Further, the fee payment notification module 318 may send the user a message from the caller when the caller pays the fee. For example, the fee payment notification module 318 may send the user a message thanking the user for accepting the caller's incoming call.

The fee payment notification module 318 may also notify the user of other information associated with the caller being charged a fee by the fee module 202. For example, the fee payment notification module 318 may notify the user of the amount of the fee, elapsed time of the call, number of times the caller has placed an incoming call to the user, number of times the caller has paid a fee, at what average time of day the caller places incoming calls to the user, total aggregate amount of fees charged to all callers, and so on. The user may then, for example, use this information to adjust the fees that the user wishes the fee module 202 to charge callers.

In another embodiment, the fee payment notification module 318 may further notify the user of an obligation of a minimum call time. For example, if the caller accepts a fee, the user may have an obligation to listen to the caller for a particular amount of time. The fee payment notification module 318 may notify the user of this obligation in a variety of different ways, similar to the above-described notification that the caller has been charged the fee. In this case, however, an effective way that the fee payment notification module 318 may notify the user is during the call via automated voice recording. This enables the user to be aware of the obligation.

If the call ends before the passing of the minimum call time, in one embodiment the fee waiver module 210 exempts the incoming call from the fee. The fee waiver module 210 may do this in a fashion similar to how the fee waiver module 210 waives the fee for callers on the exemption list (as described above). The fee waiver module 210, however, may not exempt the incoming call from the fee if the call ends as a result action by the caller. For example, if the caller ends the call before the minimum call time passes, the fee waiver module 210 may not waive the fee for the caller.

Alternatively, if the caller ends the call before the minimum call time passes, rather than the fee waiver module 210 waiving the fee, the fee waiver module 210 may provide the caller with a credit. This credit may be, for example, an electronic token that, when presented by the caller during a subsequent incoming call to the user, may cause the fee waiver module 210 to waive at least a portion of the fee charged the caller by the fee module 202. The amount of the fee waived in response to the token may depend, for example, on how much of the minimum call time passed during the original call.

The fee waiver module 210 may, in addition, notify the user that the fee has been waived due to the user ending the call before the minimum call time obligation. The fee waiver module 210 may also notify the user that the fee waiver module 210 has given the caller a credit or token because the user ended the call before the minimum call time. The fee waiver module 210 may also notify the user as to the value of the caller's credit or token. These notifications may be sent in any variety of ways, for example, as described herein for other notifications.

Figure 4:
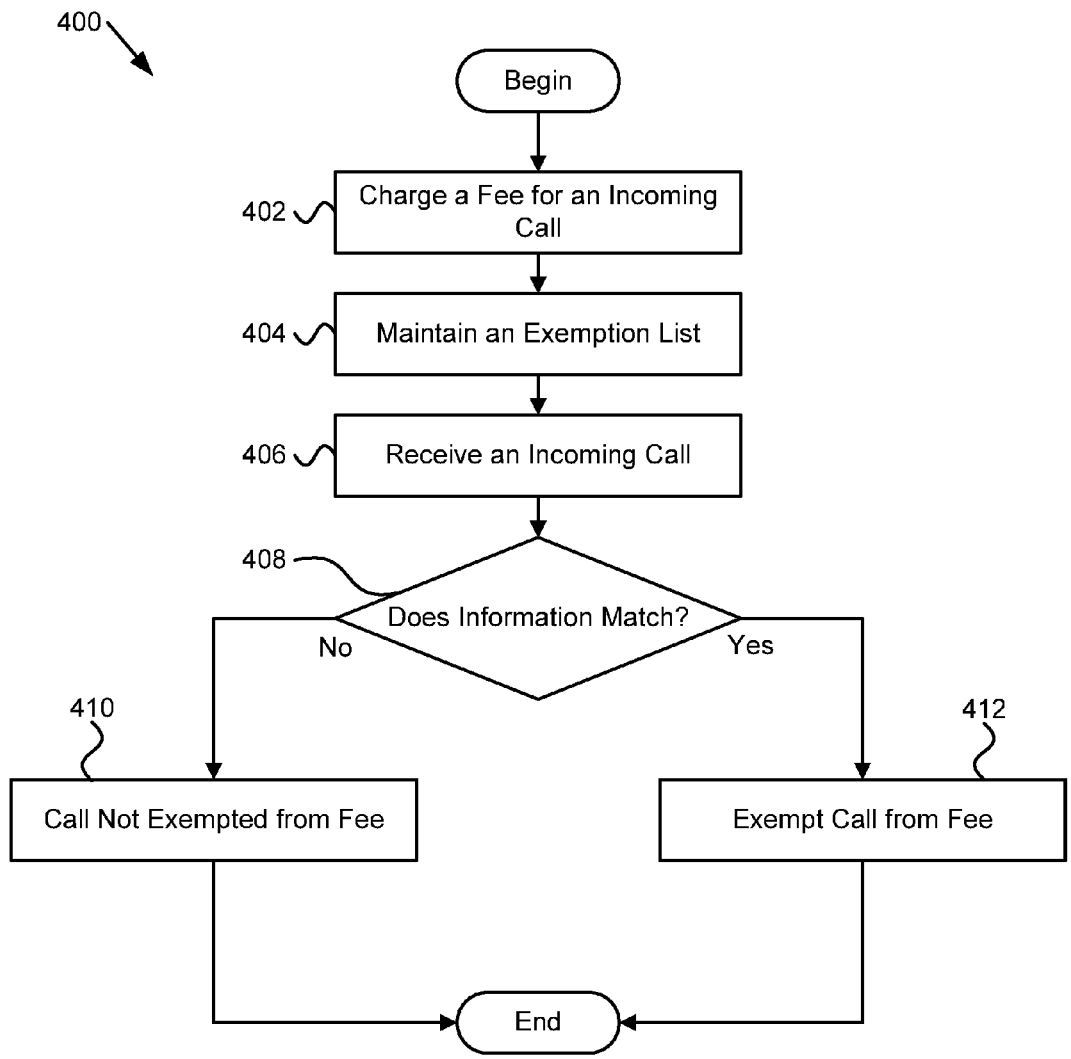
FIG. 4 is a schematic flow chart diagram illustrating one embodiment of a method for filtering telephone calls.

FIG. 4 is a schematic flow chart diagram illustrating one embodiment of a method 400 for filtering telephone calls. The method 400 begins and charges 402 a fee for an incoming call. The incoming call is made by a caller to a user and the fee is charged to the caller for the incoming call. In one embodiment, the fee module 202 charges 402 a fee for the incoming call.

The method 400 maintains 404 an exemption list. The exemption list includes callers and associated information for each caller in the exemption list. The associated information is operable to identify a caller in the exemption list when the user receives an incoming call from a caller in the exemption list. The exemption list includes callers whose calls are exempt from the fee, for example, callers that the user does not want to charge for an incoming call. In one embodiment, the exemption list module 204 maintains 404 the exemption list. The method 400 receives 406 an incoming call. In one embodiment, the call module 206 receives 406 the incoming call. The method 400 determines 408 if information associated with the incoming call matches information associated with a caller in the exemption list. The matching module 208, in one example, determines 408 if the information matches.

If the method 400 determines 408 that the information matches, the method 400 exempts 412 the incoming call from the fee charged to the caller, and the method 400 ends. If however, the method 400 determines 408 that the information does not match, the method 400 may not exempt 410 the incoming call from the fee charged to the caller, and the method 400 ends.

Figure 5:
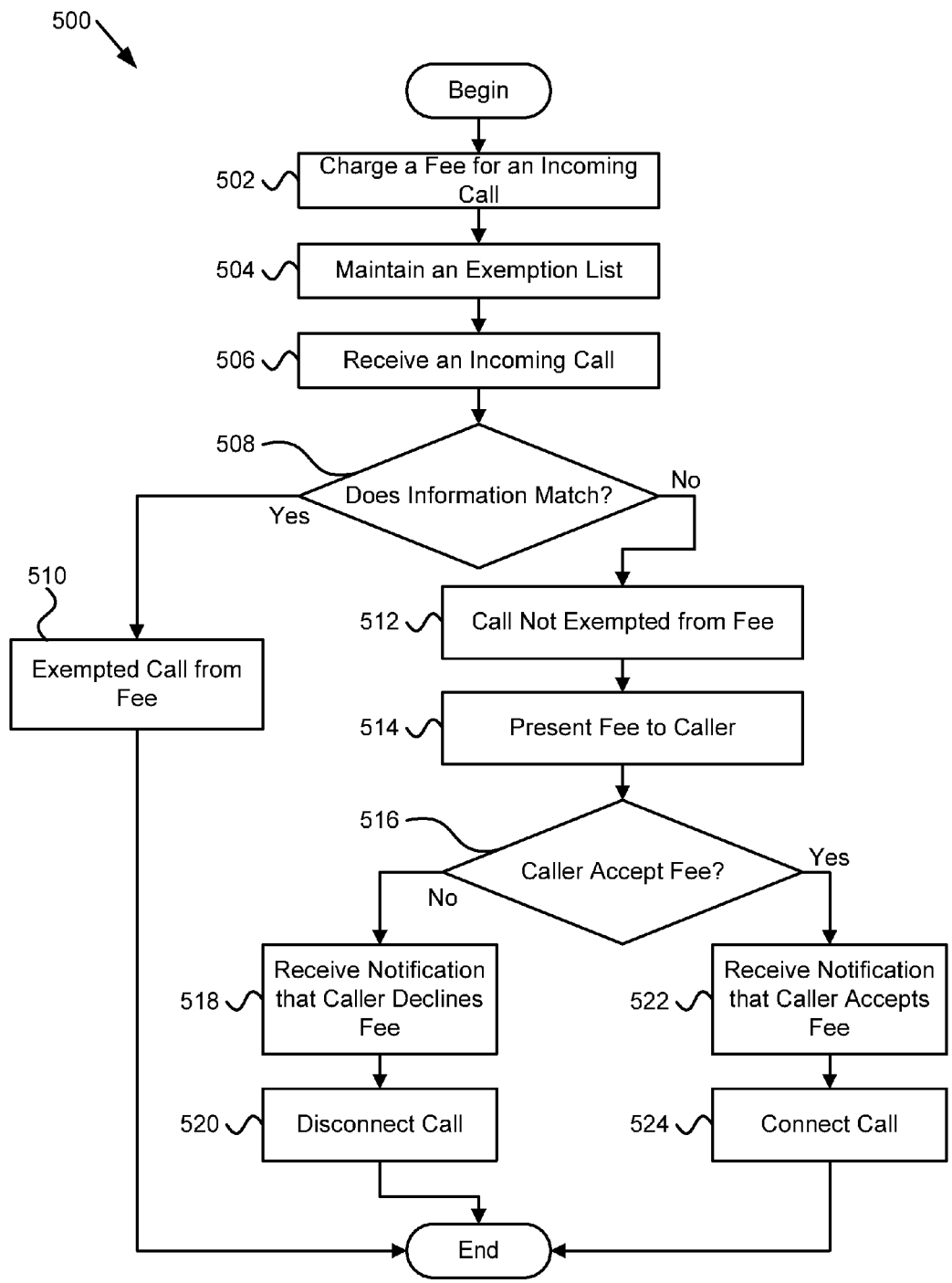
FIG. 5 is a schematic flow chart diagram illustrating another embodiment of a method for filtering telephone calls.

FIG. 5 is a schematic flow chart diagram illustrating another embodiment of a method 500 for filtering telephone calls. The method 500 begins and charges 502 a fee for an incoming call. The method 500 maintains 504 an exemption list. The method 500 receives 506 an incoming call and determines 508 if information associated with the incoming call matches information associated with a caller in the exemption list.

If the method 500 determines 508 that the information matches, the method 500 exempts 510 the incoming call from the fee charged to the caller, and the method 500 ends. If however, the method 500 determines 508 that the information does not match, the method 500 may not exempt 512 the incoming call from the fee charged to the caller. Accordingly, the method 500 presents 514 the fee to the caller. In one embodiment, the presentation module 302 presents 514 the fee to the caller. In response, the caller may either accept or not accept the fee.

If the caller accepts 516 the fee, the method 500 receives 522 a notification that the caller accepts the fee and connects 524 the incoming call to the user, and the method 500 ends. In one embodiment, the acceptance module 304 receives 522 notification that the call accepts the fee and the connection module 306 connects 524 the call.

If, however, the caller does not accept 516 the fee, the method 500 receives 518 a notification that the caller declined the fee and the method 500 disconnects 520 the incoming call to the user, and the method 500 ends. In one example, the decline module 308 receives 518 notification that the caller has declined the call and the disconnect module 310 disconnects the call.

Figure 6A:
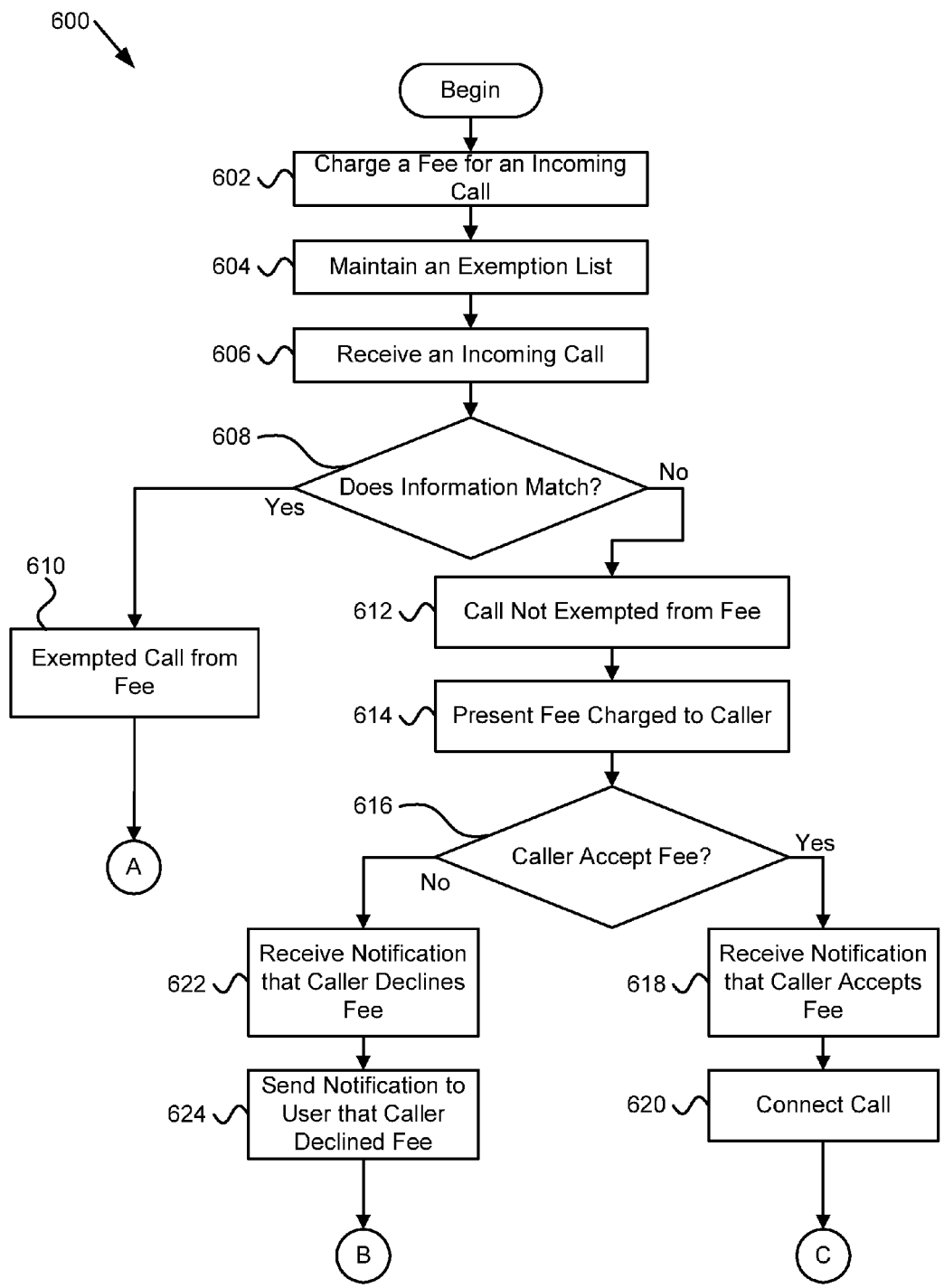
FIG. 6A is a schematic flow chart diagram illustrating a first part of yet another embodiment of a method for filtering telephone calls.
Figure 6B:
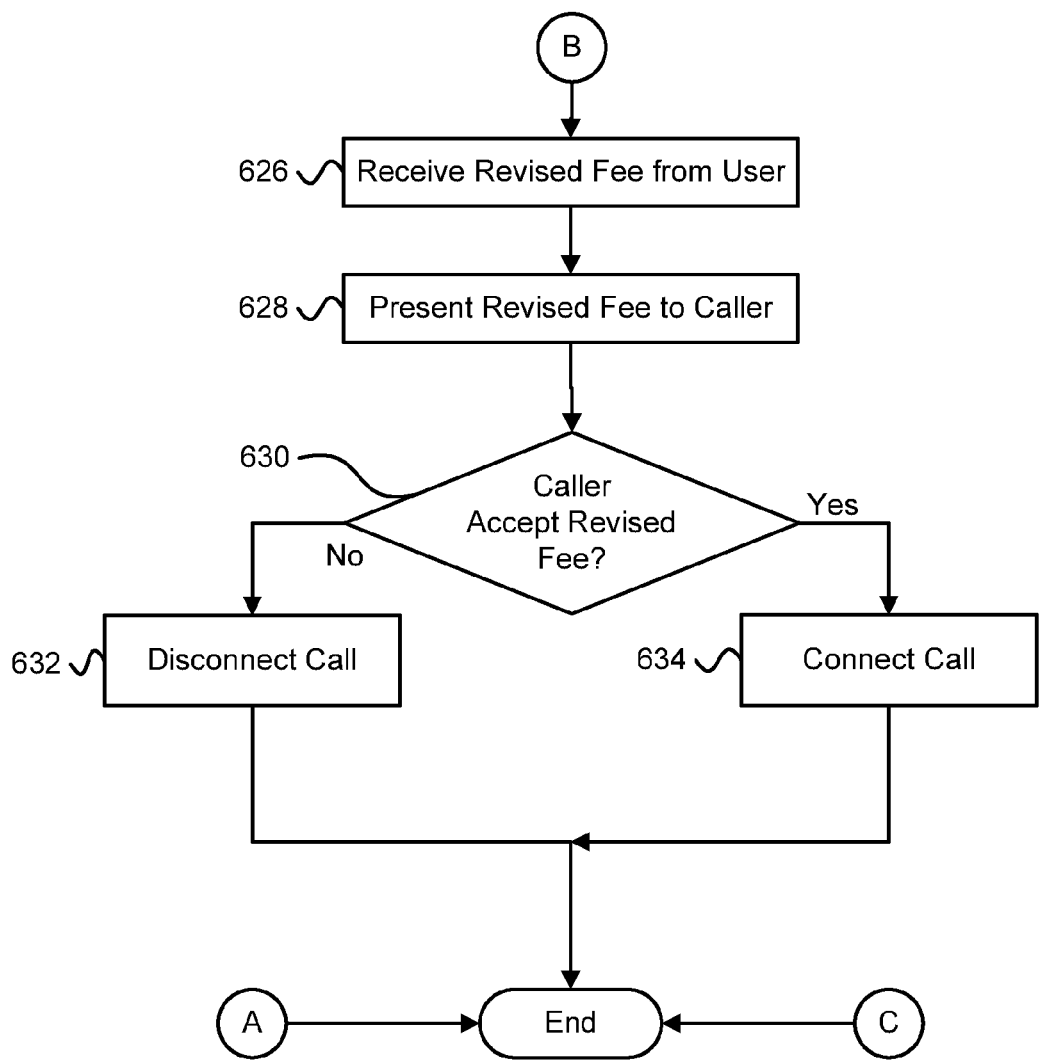
FIG. 6B is a schematic flow chart diagram illustrating a second part of the embodiment of FIG. 6A.

FIGS. 6A and 6B are schematic flow chart diagrams illustrating another embodiment of a method 600 for filtering telephone calls. As illustrated in FIG. 6A, the method 600 begins and charges 602 a fee for an incoming call. The method 600 maintains 604 an exemption list. The method 600 receives 606 an incoming call and determines 608 if information associated with the incoming call matches information associated with a caller in the exemption list.

If the method 600 determines 608 that the information matches, the method 600 exempts 610 the incoming call from the fee charged to the caller, and (follow A on FIG. 6A to A on FIG. 6B) the method 600 ends. If however, the method 600 determines 608 that the information does not match, the method 600 may not exempt 612 the incoming call from the fee charged to the caller. Accordingly, the method 600 presents 614 the fee charged to the caller. In response, the caller may either accept or not accept the fee.

If the caller accepts 616 the fee, the method 600 may receive 618 a notification that the caller accepts the fee. Then, the method 600 connects 620 the incoming call to the user, and (follow C on FIGS. 6A to C on FIG. 6B) the method 600 ends.

If however, the caller does not accept 616 the fee, the method 600 receives 622 a notification that the caller declined the fee. The method 600 sends 624 a notification to the user that the caller declined the fee, and (follow B on FIGS. 6A to B on FIG. 6B) the method 600 receives 626 a revised fee from the user. The method 600 presents 628 the revised fee to the caller. In one embodiment, the decline notification module 312 sends 624 a notification that the caller declined the fee, the revised fee module 314 receives 626 a revised fee from the user and the revision notification module 316 presents 628 the revised fee to the caller. In response, the caller may either accept or not accept the revised fee.

If the caller accepts 630 the revised fee, the method 600 connects 634 the incoming call to the user, and the method 600 ends. If however, the caller does not accept 630 the revised fee, the method 600 disconnects 632 the incoming call to the user, and the method 600 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a fee module that charges a fee for an incoming call, the fee being specific to the incoming call, the incoming call being made by a caller to a user, the fee module charging the caller for the incoming call;
an exemption list module that maintains an exemption list, the exemption list comprising one or more callers and associated information for each caller in the exemption list, the associated information operable to identify a caller in the exemption list when the user receives an incoming call from a caller in the exemption list, the exemption list comprising callers whose calls are exempt from the fee charged by the fee module;
a call module that receives an incoming call;
a matching module that determines if information associated with the incoming call matches information associated with a caller in the exemption list;
a fee payment notification module that notifies the user that the caller has been charged a fee by the fee module and notifies the user of an obligation of a minimum call time; and
a fee waiver module that exempts the incoming call from the fee charged by the fee module in response to the matching module determining that information associated with the incoming call matches information associated with the caller in the exemption list,
wherein the fee module charges the fee for each incoming call not exempted by the fee waiver module and, if the call ends prior to the passing of the minimum call time, the fee waiver module one of exempts the incoming call from the fee and reduces the fee charged to the caller,
wherein at least a portion of the fee module, exemption list module, call module, matching module, and fee waiver module comprise one or more of logic hardware and executable code, the executable code stored on one or more computer readable storage media.

2. The apparatus of claim 1, wherein the fee module further comprises:
a presentation module that presents the fee charged by the fee module to the caller in response to the matching module determining that the information associated with the incoming call does not match information associated with a caller in the exemption list;

an acceptance module that, in response to the presentation module presenting the fee to the caller, receives a notification that the caller accepts the fee, wherein the fee module charges the fee to the caller for the incoming call in response to the acceptance module receiving the notification that the caller accepts the fee; and a connection module that connects the incoming call to the user in response to the fee module charging the fee to the caller.

3. The apparatus of claim 2, wherein the fee module further comprises:

a decline module that receives a notification that the caller declined the fee in response to the presentation module presenting the fee to the caller, wherein the fee module exempts the incoming call from the fee in response to the decline module receiving the notification that the caller declined the fee; and a disconnect module that disconnects the incoming call in response to the decline module receiving the notification that the caller declined the fee.

4. The apparatus of claim 3, wherein the fee module further comprises:

a decline notification module that sends a notification to the user that the caller declined the fee;

a revised fee module that receives a revised fee from the user and presents the revised fee to the caller; and a revision notification module that receives a notification that the caller accepts the revised fee in response to the revised fee module presenting the revised fee to the caller, wherein the fee module charges the revised fee to the caller for the incoming call in response to the revised fee module receiving the notification that the caller accepts the revised fee and wherein the connection module connects the incoming call to the user in response to the revised fee module receiving the notification that the caller accepts the revised fee.

5. The apparatus of claim 1, wherein the exemption list module maintains the exemption list in response to input from the user.

6. The apparatus of claim 1, wherein the exemption list module comprises a plurality of exemption lists, each exemption list being associated with one or more users.

7. The apparatus of claim 1, wherein one or more callers on the exemption list comprise contacts of the user on a social media account of the user within a social media application.

8. The apparatus of claim 1, wherein one or more callers on the exemption list comprise contacts within an electronic contact list maintained by the user.

9. The apparatus of claim 8, wherein the contacts within the electronic contact list comprises a subset of contacts maintained by the user, the subset comprising contacts designated by the user for the exemption list.

10. The apparatus of claim 1, wherein the associated information of callers in the exemption list comprises information derived from one or more of a contact list associated with the user's social media account within a social media application; and contacts within an electronic contact list maintained by the user.

11. The apparatus of claim 1, wherein the matching module detects, within the information associated with the incoming call, an exemption code, wherein the fee waiver module exempts the incoming call from the fee and the exemption list module places the caller and the associated information that identifies the caller on the exemption list in response to the matching module detecting the exemption code.

12. A method comprising:

charging a fee for an incoming call, the fee being specific to the incoming call, the incoming call being made by a caller to a user, the fee being charged to the caller for the incoming call;

maintaining an exemption list, the exemption list comprising one or more callers and associated information for each caller in the exemption list, the associated information operable to identify a caller in the exemption list when the user receives an incoming call from a caller in the exemption list, the exemption list comprising callers whose calls are exempt from the fee;

receiving an incoming call;

determining if information associated with the incoming call matches information associated with a caller in the exemption list;

notifying the user of an obligation of a minimum call time;

exempting the incoming call from the fee charged to the caller in response to determining that information associated with the incoming call matches information associated with the caller in the exemption list, wherein the fee is charged for each incoming call that is not exempted and, if the call ends prior to the passing of the minimum call time, one of exempting the incoming call from the fee and reducing the fee charged to the caller; and notifying the user that the caller has been charged a fee.

13. The method of claim 12, further comprising:

presenting the fee charged to the caller in response to determining that the information associated with the incoming call does not match information associated with a caller in the exemption list;

receiving, in response to presenting the fee to the caller, a notification that the caller accepts the fee, wherein charging a fee for an incoming call further comprises charging the fee to the caller for the incoming call in response to receiving the notification that the caller accepts the fee; and connecting the incoming call to the user in response to charging the fee to the caller.

14. The method of claim 13, further comprising:

receiving a notification that the caller declined the fee in response to the caller being presenting the fee, wherein the incoming call is exempted from the fee in response to receiving the notification that the caller declined the fee; and disconnecting the incoming call in response to receiving the notification that the caller declined the fee.

15. The method of claim 14, further comprising:

sending a notification to the user that the caller declined the fee;

receiving a revised fee from the user and presenting the revised fee to the caller; and receiving a notification that the caller accepted the revised fee in response to the caller being presented the revised fee, wherein the revised fee for the incoming call is charged to the caller in response to receiving the notification that the caller accepts the revised fee and wherein the incoming call is connected to the user in response to receiving the notification that the caller accepts the revised fee.

16. The method of claim 12, wherein maintaining the exemption list comprises maintaining a plurality of exemption lists, each exemption list being associated with one or more users.

17. The method of claim 12, wherein one or more callers on the exemption list comprise contacts of the user on a social media account of the user within a social media application.

18. A computer program product for selectively filtering telephone calls, the computer program product comprising a non-transitory computer readable storage medium having program code embodied therein, the program code readable/executable by a processor to:

charge a fee for an incoming call, the fee being specific to the incoming call, the incoming call being made by a caller to a user, the fee being charged to the caller for the incoming call;

maintain an exemption list, the exemption list comprising one or more callers and associated information for each caller in the exemption list, the associated information operable to identify a caller in the exemption list when the user receives an incoming call from a caller in the exemption list, the exemption list comprising callers whose calls are exempt from the fee charged by the fee module;

synchronize the exception list with an electronic contact list maintained on the user's telephone, wherein the one or more callers comprise contacts within the electronic contact list;

receive an incoming call;

determine if information associated with the incoming call matches information associated with a caller in the exemption list; and exempt the incoming call from the fee charged to the caller in response to determining that information associated with the incoming call matches information associated with the caller in the exemption list, wherein the fee is charged for each incoming call that is not exempted.

19. The computer program product of claim 18, the program code further readable/executable by a processor to notify the user of an obligation of a minimum call time and, if the call ends prior to the passing of the minimum call time, one of exempt the incoming call from the fee and reduce the fee charged to the caller.

* * * * *